J. M. FRISS.
STORAGE BATTERY.
APPLICATION FILED MAR. 5, 1920
1,366,070.
Patented Jan. 18, 1921.
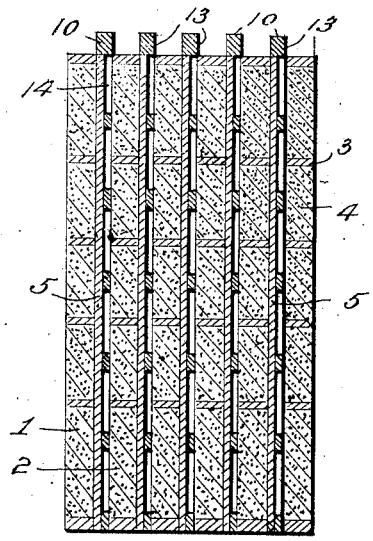
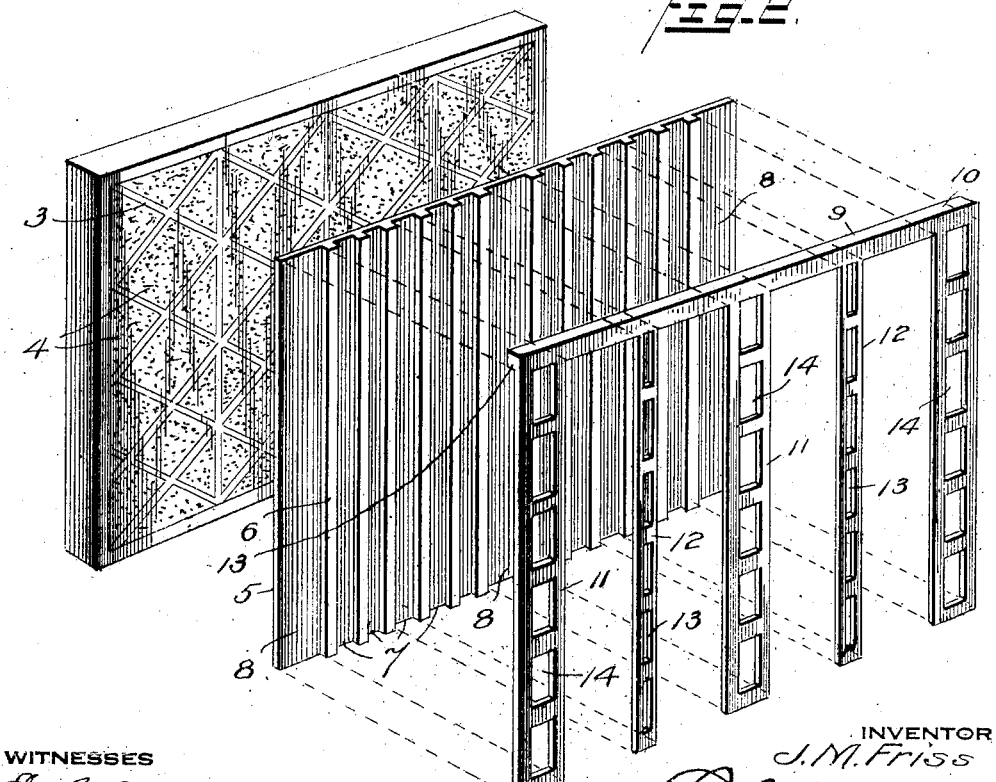
WITNESSES
INVENTOR
J. M. Friss
BY
ATTORNEY

UNITED STATES PATENT OFFICE.

JOHN MARTIN FRISS, OF RACINE, WISCONSIN.

STORAGE BATTERY.

1,366,070.     Specification of Letters Patent.     Patented Jan. 18, 1921.

Application filed March 5, 1920. Serial No. 363,411.

*To all whom it may concern:*

Be it known that I, JOHN M. FRISS, a citizen of the United States, residing at Racine, in the county of Racine and State of Wisconsin, have invented a new and useful Storage Battery, of which the following is a specification.

This invention has reference to storage batteries and has especial reference to isolator devices to be used in connection with separators employed to prevent the storage battery elements or plates from coming into physical contact. It is the object of the invention to provide means whereby the buckling of the battery plates will not result in such injury to the separators as to produce short circuits, and at the same time prevent increase in the internal resistance of the battery.

The invention is intended particularly for use in storage batteries of the kind employed as starting batteries for automobiles and therefore demanding heavy output of current as well as requiring relatively great mechanical strength to withstand the shocks and jars of travel to which the batteries are subjected when mounted on an automobile and moving over rough roads.

In the majority of storage batteries used for starting purposes, the positive and negative plates or elements of the battery are held apart by relatively thin wooden sheets, some makers using certain woods and others using certain other woods, but the sheets are quite similar and in many instances these sheets are grooved so that the grooves or ridges separating or defining the grooves extend up and down in the battery, the ribs serving for strengthening purposes and the grooves between the ribs producing a desirable thinness through which the battery fluid and the current may readily pass.

Wooden separators will deteriorate to such an extent under the action of the electrolyte as to actually crumble away, especially at the lower ends and will also be so weakened that swelling of the active material causes short-circuiting.

The invention provides an isolator of insulating material unaffected by the electrolyte and of such skeleton form that the plates, even if they swell, cannot force their way through the wooden separator but present such mechanical resistance to the pressure of the swollen active material that short-circuiting is prevented. Each isolator comprises a connecting top bar sufficiently thick to rest upon the upper edge of the wood separator and this top bar is provided with other, pendent, bars so located and of such thickness as to seat against the thinner portions of the wood separator about flush with the ribs of the separator. Furthermore, the pendent bars are perforated, preferably with relatively large perforations which may be suitably elongated, whereby but little impediment is presented to the free flow of the electrolyte and of current from one plate of the battery element through the wood separator to the opposite plate or element.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is a vertical section from front to rear through an assembled group of battery elements with separators and isolators in place.

Fig. 2 is a displayed perspective view of a single battery element with a separator and isolator.

Referring to the drawings, there are shown battery plates or elements 1, 2, respectively arranged in alternation and each comprising a grid 3 and active material 4, as is customary. For the sake of simplicity of illustration the usual terminal lugs are omitted.

Adapted to be lodged between the positive and negative plates or elements 1 and 2 are sheets 5 usually made of wood but sometimes of some other more or less porous material permeable by the electrolyte so as to readily conduct the current from one plate to the other, with the thickness of the sheets and the permeability of such sheets such as to reduce the internal resistance of the battery to a minimum. Since the particular material of the separator does not necessarily enter into the invention, and since wooden separators are commonly used in batteries, it will be considered, in this description, that wooden separators are used, without, however, limitation to such particular separators.

Extending across the plate 5 in a direction which is up and down of the plate in the assembled position, are spaced parallel ribs 6 producing grooves 7 between them with terminal and intermediate wider grooves 8 at the ends and midway of the width of the plate. In large battery plates the number of grooves 7 and 8 may be more than in small plates.

The thickness of the plate 5 at the ribs 6 determines the separation of the battery plates one from the other and therefore determines the internal resistance of the battery so that if any isolator which increases the spacing of the plates be included in the battery there is a corresponding increase in the internal resistance, wherefore proposals to overcome the effects of deterioration of the wooden separators by the use of celluloid or hard rubber isolators, adding to the separation of the plates, has been abandoned as impracticable.

In accordance with this invention, there is provided an isolator 9 of skeleton form comprising an end bar 10 carrying a series of pendently arranged bars 11, 12, respectively, with the end bar 10 having a side overhang 13 adapted to rest upon the top edge of the sheet 5 with the bars 11 seated in the grooves 8 and the bars 12 seated in appropriate ones of the grooves 7. The thickness of the bars 11 and 12 correspond to the depths of the grooves 7 and 8 so that the isolator, when applied to the sheet 5, is flush with the outer edges of the ribs 6. Consequently, the separation of the plates 1 and 2 is in nowise increased by the presence of the isolator. The pendent bars 11 are wider and consequently more sturdy than the bars 12, thus offering more mechanical resistance at the ends and central portion of the sheet 5 than at other portions thereof. In this manner, those parts of the separator most liable to be subjected to the pressure of the swelling or buckling plates present the greatest mechanical resistance to the effects of such swelling or buckling, wherefore the liability of short-circuiting, due to the swelling of the active material of the plates and the breaking down of the wood separators, is practically eliminated.

The pendent bars 11 and 12 are pierced by perforations 14 and 15, respectively, the perforations 14 being of greater area than the perforations 15, thus increasing the permeability of the bars 11 and 12 to both the electrolyte and the current over finely perforated sheets of rubber or celluloid which have been proposed and which are laid flat against the outer edges of the ribs 6, thereby increasing the internal resistance because of the corresponding increase in the separation of the plates. Experience has shown that such increase of internal resistance may amount to as much as ten per cent.

The isolator, being of hard material, protects the wood separator by holding the battery plates or elements apart, for the plates cannot swell, where backed up by the isolator, sufficiently to break through the wood and cause short-circuiting.

With an isolator constructed as shown or otherwise constructed so as to seat in the wooden separator, and especially seat at the lower corners and central portion, practically all those parts of the wooden separators which are liable to be injured or affected to an extent to permit short circuits, are obviated.

The invention is intended to include instrumentalities by means of which the battery plates are positively held apart at those points where the breaking down of the wood separators may cause short-circuiting, and consequently other arrangements of the isolator may be provided for the purpose. It is to be understood that the perforations in the isolator may be of various shapes and may be round or square or elongated, while the isolator is so constructed as to seat in the grooves of the separator and such grooves may be so shaped as to receive the bars of the isolator, whether these bars be a series of pendent parallel bars, as shown in the drawings, or be shaped or connected in other ways. In any instance, the wooden sheet 5 is so made as to receive the isolator and seat it without increasing the ordinary separation of the plates, but permitting the presence of the isolator with a minimum decrease in the permeability of the spacing means for separating one plate from the next in order. Ordinarily, the grooved side of the wooden separators and the isolators associated therewith are placed toward and rest against the positive plates since such plates are the ones that perform the greater work and require the most circulation. It is, however, feasible to use these parts otherwise, if desired.

What is claimed is:

1. In a storage battery, positive and negative plates, separating sheets between the plates and each of a total thickness corresponding to the separation of the plates, and isolators seated in the separating sheets substantially flush with the outer faces of the separating sheets for engaging the adjacent battery plates.

2. In a storage battery, positive and negative plates or elements, wooden separating sheets between and engaging the positive and negative plates with each separator having grooves in one face thereof, and isolators of insulating material unaffected by the battery electrolyte and seated in grooves in the wooden separators, said isolators being of a thickness to avoid separating the battery plates to a greater extent than the separating sheets alone.

3. In a storage battery, positive and negative plates or elements, grooved wooden separating sheets located between the plates or elements, and isolators of skeleton form having bars seated in the grooves of the separating sheets each substantially flush with the face of the separating sheet carrying it and constituting mechanically resistant means for holding the plates from electrical contact.

4. In a storage battery, positive and negative plates or elements, grooved wooden separating sheets between the plates, and isolators between the separating sheets and the adjacent plates having perforated bars seated in certain of the grooves and said grooves being shaped to receive the bars, whereby the total thickness of a separating plate and of an isolator associated therewith corresponds substantially to the thickness of the separator alone.

5. In a storage battery, positive and negative plates or elements, grooved wooden separating sheets between the plates, and isolators between the separating sheets and the adjacent plates having perforated bars seated in certain of the grooves and said grooves being shaped to receive the bars, whereby the total thickness of a separating plate and of an isolator associated therewith corresponds substantially to the thickness of the separator alone, the bars of the isolators corresponding in position to the ends and intermediate portions of the plates and leaving the major portions of the plates free therefrom.

In testimony that I claim the foregoing as my own, I have hereto affixed my signature.

JOHN MARTIN FRISS.